United States Patent
Spitaels

(10) Patent No.: US 8,108,496 B2
(45) Date of Patent: Jan. 31, 2012

(54) METHOD AND APPARATUS FOR SELECTING FORWARDING MODES

(75) Inventor: James S Spitaels, Worcester, MA (US)

(73) Assignee: American Power Conversion Corporation, West Kingston, RI (US)

( * ) Notice: Subject to any disclaimer, the term of this patent is extended or adjusted under 35 U.S.C. 154(b) by 1493 days.

(21) Appl. No.: 11/101,192

(22) Filed: Apr. 7, 2005

(65) Prior Publication Data

US 2005/0246431 A1  Nov. 3, 2005

Related U.S. Application Data

(60) Provisional application No. 60/560,302, filed on Apr. 7, 2004.

(51) Int. Cl.
  *G06F 15/177* (2006.01)
(52) U.S. Cl. ............ 709/221; 709/220; 709/222
(58) Field of Classification Search ......... 709/209–222, 709/238–244, 249; 370/254, 328, 338, 349, 370/389, 463
  See application file for complete search history.

(56) References Cited

U.S. PATENT DOCUMENTS

| | | | |
|---|---|---|---|
| 4,597,078 A | | 6/1986 | Kempf |
| 5,572,528 A | | 11/1996 | Shuen |
| 6,006,275 A | * | 12/1999 | Picazo et al. ............ 709/249 |
| 6,098,769 A | | 8/2000 | Yen |
| 6,561,328 B1 | | 5/2003 | Huang |
| 6,608,264 B1 | | 8/2003 | Fouladpour |
| 6,757,269 B2 | * | 6/2004 | Dorenbosch et al. ......... 370/338 |
| 6,870,852 B1 | * | 3/2005 | Lawitzke ................. 370/401 |
| 6,936,936 B2 | | 8/2005 | Fischer et al. |
| 6,980,204 B1 | | 12/2005 | Hawkins et al. |
| 7,035,281 B1 | * | 4/2006 | Spearman et al. .......... 370/465 |
| 7,088,727 B1 | * | 8/2006 | Short et al. ............... 370/401 |
| 7,106,739 B2 | * | 9/2006 | Beier ..................... 370/392 |
| 7,164,684 B2 | * | 1/2007 | Matteson et al. ........... 370/401 |
| 7,215,660 B2 | * | 5/2007 | Perlman .................. 370/338 |
| 7,317,896 B1 | | 1/2008 | Saxena et al. |
| 2002/0118663 A1 | * | 8/2002 | Dorenbosch et al. ......... 370/338 |
| 2002/0147031 A1 | | 10/2002 | Hood |
| 2002/0152285 A1 | | 10/2002 | Wheeler et al. |

(Continued)

FOREIGN PATENT DOCUMENTS

WO  WO 2005119977 A1 * 12/2005

OTHER PUBLICATIONS

R. Droms, Dynamic Host Configuration Protocol, Bucknell University, Mar. 1997.

(Continued)

*Primary Examiner* — Kevin Bates
*Assistant Examiner* — Mohammed Ahmed
(74) *Attorney, Agent, or Firm* — Lando & Anastasi, LLP

(57) ABSTRACT

A method is provided for automatically determining in which data forwarding mode a network device should operate. Also, other settings for operation of the device may be automatically determined. These modes and settings may be selected based on one or more attributes of the network to which the device is connected. In one example, the network device includes a wired network interface and a wireless network interface. The device may be capable of operating in a routing, bridging, or repeating mode. The network device may select a forwarding mode based on attributes of the network that are detected or otherwise received by the network device.

20 Claims, 3 Drawing Sheets

U.S. PATENT DOCUMENTS

| | | | |
|---|---|---|---|
| 2002/0172224 A1* | 11/2002 | Matteson et al. | 370/502 |
| 2003/0065816 A1* | 4/2003 | Dharmadhikari et al. | 709/240 |
| 2003/0115298 A1* | 6/2003 | Baker | 709/220 |
| 2003/0135681 A1 | 7/2003 | Laity et al. | |
| 2004/0242197 A1* | 12/2004 | Fontaine | 455/411 |
| 2005/0102406 A1* | 5/2005 | Moon | 709/228 |
| 2005/0114648 A1* | 5/2005 | Akundi et al. | 713/153 |
| 2005/0229238 A1* | 10/2005 | Ollis et al. | 726/4 |

OTHER PUBLICATIONS

Droms, R., Dynamic Host Configuration Protocol, Bucknell University, Mar. 1997.

* cited by examiner

METHOD AND APPARATUS FOR SELECTING FORWARDING MODES

RELATED APPLICATIONS

This application claims priority under 35 U.S.C. §119(e) to U.S. Provisional Application Ser. No. 60/560,302, entitled "METHOD AND APPARATUS FOR SELECTING FORWARDING MODES," filed on Apr. 7, 2004 which is herein incorporated by reference in its entirety.

FIELD OF THE INVENTION

The invention relates generally to network communication, and more particularly to networking devices that perform forwarding of information in one or more forwarding modes.

BACKGROUND OF THE RELATED ART

With the advent of enterprise networks and public networks such as the Internet, network communication methods and protocols have become commonplace for communicating data between one or more nodes. Such nodes may be, for example, personal computers (PCs), servers, and other types of computing systems. Communication occurs over many media forms, including air (e.g., wireless), copper cabling and fiber media, and is generally performed using one or more active devices that perform routing of data, switching, amplification of signals, or other functions relating to the forwarding of data.

These devices, referred to in the art generally as network communication devices or systems, receive data from nodes and depending on their configuration and other factors, forward the data onto other networks to one or more other nodes. Such network communication devices include, for instance, routers, bridges or switches, and repeaters. Each of these device types perform data forwarding at one or more levels. At the lowest level (e.g., a hardware level), a repeater receives a signal corresponding to data transmitted by a node or other network communication device, and the repeater "repeats" the received signal. Generally, the repeater will perform retiming and conditioning (e.g., amplification) of the signal before the signal is repeated onto a network.

In a bridge or switch, data within the transmitted signal is inspected, and data is forwarded based upon the inspected data. More particularly, bridges and switches forward data based upon data link information stored within a portion of a data link frame. According to the IEEE 802.1d bridging specification, data is forwarded based upon an inspection of a destination address of a node stored in a header of the data link frame. Forwarding decisions in bridged networks are generally assisted by topology-determination protocols (e.g., spanning tree) that determine where data should be forwarded.

In a router, data is forwarded according to a routing protocol that determines the topology of the network, and where data is routed along the topology. Network devices "learn" where to forward networks using routing protocols (e.g., OSPF, EIGRP, etc.) that assist the network devices to determine where to forward data. Occasionally, network devices have static configuration data (e.g., routing table entries, ACLs, etc.) that determine where data should be forwarded.

Network devices that implement repeating, bridging, and routing generally include interfaces (e.g., command line, web-based, or SNMP agent interfaces) through which network device configurations may be changed (e.g., by a network administrator or other user). More particularly, network devices may receive manual configuration changes in operating parameters that affect how the network device forwards data.

There are many types of routing devices that may be used to communicate data. For wireless networks such as those that communicate data in accordance with IEEE Standards 802.11a, 802.11b, 802.11g and/or 802.11n, these devices generally attach to a physical network such as Ethernet, and route data to and from devices within a wireless network. Generally, such devices need to be configured by an administrator (or end user) to setup network parameters that the device uses. For instance, such devices may operate in more than one forwarding mode as discussed above. More specifically, such devices may be configured to operate as routers, switch/bridges, or repeaters.

Also, interfaces associated with such devices may have one or more settings that need to be established before communication can occur. Settings for the interfaces include addresses (e.g., TCP/IP addresses for interfaces associated, for example, with LAN or WAN ports, or wireless network ports), subnet masks, domain name server (DNS) information, Dynamic Host Configuration Protocol (DHCP) settings, network address translation (NAT) configuration settings, encryption settings, service set identifier (SSID) information, and other information. Configuration of such settings is generally a time-consuming task, and requires technical knowledge above that of the ordinary computer user. What is needed, therefore, is an easier method for configuring such devices.

SUMMARY

According to one aspect of the present invention, a system and method is provided for configuring a network device. According to one embodiment, the configuration of the device is performed automatically by the device based upon one or more attributes of a network to which the device is connected. For example, in the case of a wireless communication device that is capable of performing routing, switching/bridging, and repeating forwarding functions, the wireless communication device may configure one or more operating parameters based upon one or more detected attributes of the network to which it is attached. More specifically, the network device may automatically switch forwarding modes based one or more detected attributes. These attributes may include, for example, DHCP server information, designated router network information, information assigned to the device (e.g., through DHCP), service set identifier (SSID), encryption settings, and other parameters. Because the device automatically determines its configuration based upon one or more attributes of the network, intervention by an administrator or user is not required to configure the device.

This feature is useful, for instance, in the case of a portable networking device that may be transported and coupled to more than one network. According to one aspect of the invention, a wireless networking device is provided that is portable. That is, the wireless networking device may be taken from place to place, and may provide wireless networking services in locations to where the device is taken. This is useful to support communication by mobile computers (e.g., laptop, cellular phone, PDA, etc.) that are capable of communicating in a wireless network. Traditionally, such mobile computers would need to rely on a particular establishment (e.g., office, business, school, etc.) having wireless access. However, with a portable wireless networking device, the establishment need only have a network connection to establish communication with the Internet, or no connection to establish a local wireless workgroup among mobile computing devices. With such a portable wireless networking device, the device may be adapted to detect one or more parameters associated with the network to which it is coupled to automatically determine its operating configuration.

In a more specific example, such a portable wireless networking device may be transported to a first location such as a home office, where the device is coupled to a local network connection (e.g., an Ethernet connection coupled to a modem or DSL interface which is in turn attached to a cable communication system, or DSL line, respectively). The portable wireless networking device may determine, based on the router to which it is coupled, what network (e.g., a home network) to which the device is attached, and therefore load a configuration associated with the particular network. Similarly, the portable wireless networking device may be transported to a second location (e.g., a work location) where the device may be coupled to a network having operating parameters different than parameters associated with the first network. The device may be adapted to determine that the device is attached to a different network, and may therefore load different operating parameters. For instance, the portable wireless networking device may be adapted to automatically switch between routing, bridging and repeating modes (i.e., the device may be configured to operate as a router, an access point (bridge/switch), or in a repeater mode) based upon physical or logical properties of the host network.

This feature may be beneficial, as there may be a preferred mode of operation of the network device depending on the network to which the device is connected. For example, it may be preferred that the device operate in a routing mode so that the device may provide protection to its wireless clients (e.g., via a firewall feature) and so that multiple clients can share a single IP address (e.g., via a Network Address Translation (NAT) feature). Unfortunately, these same firewall and NAT features make it difficult to use the device on trusted networks (at home or in the office) because they prevent the free flow of network data from the WAN port(s) to the LAN port(s). Therefore, by allowing a portable wireless networking device to select between more than one operating mode (e.g., a routing mode for use on non-trusted networks and bridging mode for use on trusted networks), both configurations may be supported without the need for administrator or operator intervention. Many other configuration examples exist where one configuration is not optimal, or prohibits data communication.

Additionally, it may be desirable for the same device to be able to act as a wireless repeater to extend the coverage area of an existing wireless LAN. Unfortunately, the act of invoking a repeating mode on a wireless networking device is conventionally a manual process that requires administrator or user intervention. Therefore, the wireless networking device may be configured to automatically detect when a repeating mode should be used. For instance, when a wireless access point or wireless router is detected, the device may automatically select a repeating mode. Automatic mode switching eliminates the need for the user to manually switch modes. Further, such automatic mode switching eliminates the need for the user to have to know which mode is appropriate for a given situation.

According to one aspect of the invention, a network communication device is provided that comprises a processor and a plurality of network interfaces, at least one of which is adapted to receive data indicating an attribute of a network to which the network communication device is connected, and wherein the processor is adapted to automatically determine a configuration of the network communication device based upon the indicated attribute. According to one embodiment of the invention, the attribute includes at least one of the group of attributes comprising an identification of a type of the network to which the network communication device is connected, a router address, an address of an address server, an address assigned by the address server, at least a portion of a domain name assigned by the address server, an identifier associated with a wireless network to which the network communication device is connected, and a security parameter associated with the network to which the network communication device is connected. According to another embodiment of the invention, the address server is a Dynamic Host Configuration Protocol (DHCP) server. According to another embodiment of the invention, the address of the address server is a Media Access Control (MAC) address of the DHCP server. According to yet another embodiment of the invention, the address of the address server is a TCP/IP address.

According to one embodiment of the invention, the at least a portion of the domain name assigned by the address server includes a domain name suffix. According to another embodiment of the invention, the address assigned by the address server is a TCP/IP address. According to one embodiment of the invention, the identifier associated with the wireless network to which the network communication device is connected includes a service set identifier (SSID) of the wireless network. According to another embodiment of the invention, the security parameter associated with the network to which the network communication device is connected includes an encryption key. According to another embodiment of the invention, the security parameter associated with the network to which the network communication device is connected includes an encryption mode. According to another embodiment of the invention, the processor is adapted to select a forwarding mode of the network communication device based upon the indicated attribute.

According to one embodiment of the invention, the processor is adapted to select the forwarding mode from at least one of a group of forwarding modes comprising a repeating mode, a bridging mode, and a routing mode. According to another embodiment of the invention, the processor is adapted to present, to a user, at least two forwarding modes that may be implemented by the network communication device, and wherein the processor is adapted to receive, from the user, a selection of the at least two forwarding modes for use by the network communication device. According to another embodiment of the invention, the processor is adapted to intercept, from a client coupled to the network communication device, a request, and wherein the processor is adapted to respond to the request with an option to select from the at least two forwarding modes. According to one embodiment of the invention, the device further comprises a switch that allows a user to select at least one of a plurality of forwarding modes that may be implemented by the network communication device.

According to one embodiment of the invention, the processor is adapted to determine a forwarding mode of the network communication device, and wherein the processor further comprises means for determining whether a wireless network is present, and, if so, automatically selecting a repeating mode to repeat signals for the wireless network. According to another embodiment of the invention, the processor is adapted to determine a forwarding mode of the network communication device, and wherein the processor further comprises means for determining whether the network to which the network communication device is connected is trusted, and if so, selecting a bridging mode. According to another embodiment of the invention, the processor is adapted to determine a forwarding mode of the network communication device, and wherein the processor further comprises means for determining whether the network to which the network communication device is connected is trusted, and if not, selecting a routing mode.

According to another aspect of the invention, a method is provided for determining a configuration of a network device. The method comprises acts of determining a network to which the network device is coupled, and automatically determining a configuration of the network device based on the determined network.

According to another aspect of the invention, a method is provided for determining a forwarding mode of a wireless communication device. The method comprises acts of determining, by the wireless communication device, whether at least one of a wireless access point and wireless router is present, and, if so, automatically selecting a repeating mode to repeat signals for the at least one of the wireless access point and wireless router.

According to another aspect of the invention, a method is provided for determining a configuration of a network device. The method comprises acts of determining a network to which the network device is coupled, and automatically determining at least two possible configurations of the network device based on the determined network.

According to one embodiment of the invention, the method further comprises acts of presenting, to a user, the at least two possible configurations of the network device, and permitting the user to select one of the at least two possible configurations for use by the network device. According to another embodiment of the invention, the method further comprises an act of determining, among the at least two possible configurations of the network device, a preferred configuration for use by the network device.

According to one embodiment of the invention, the method further comprises an act of determining, for at least two of the plurality of interfaces of the network device, whether respectively assigned addresses are in conflict, and if so, reassigning a non-conflicting address to one of the at least two of the plurality of interfaces. According to another embodiment of the invention, a conflict in addresses includes addressing the at least two of the plurality of interfaces within a same logical network.

Further features and advantages of the present invention as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral first appears.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing.

In the drawings.

DETAILED DESCRIPTION

According to one aspect of the invention, a method is provided for automatically determining in which data forwarding mode a network device should operate. Also, other settings for operation of the device may be automatically determined. These modes and settings may be selected based on one or more attributes of the network to which the device is connected.

In one example, the network device includes a wired network interface and a wireless network interface. One example device in which various aspects of the present invention may be practiced is discussed below with respect to FIG. 1. Such a network device may be capable of operating in a routing, bridging, or repeating mode. Also, according to one embodiment of the present invention, the network device may select a forwarding mode based on attributes of the network that are detected or otherwise received by the network device.

Figure 3:
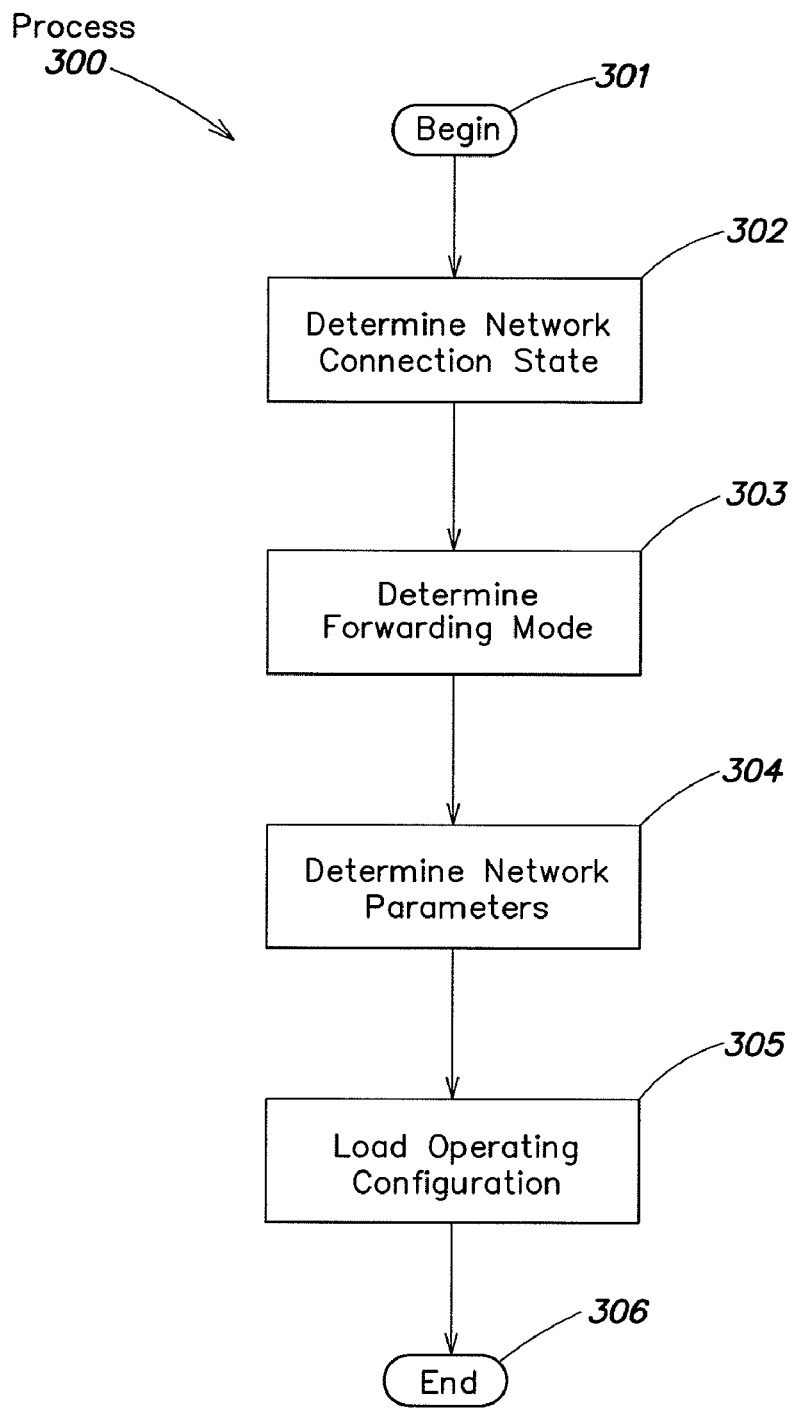
FIG. 3 shows a process by which a network communication may determine a configuration.

The network device (e.g., device 101 of FIG. 1) may follow the following example process 300 as shown in FIG. 3 for connecting to a network. At block 301, process 300 begins. At block 302, the network device determines a network connection state (e.g., whether or not the network device is attached to a network, parameters associated with any attached networks, etc.). At block 303, the device determines, based on the determined network connection state, a forwarding mode to be used by the network communication device.

In one example, upon power up or a reset of the network device, the network device may determine a forwarding mode to be used according to the following:

- if a wired network connection (e.g., an Ethernet connection) is not operational, the device is placed in a repeater mode (e.g., a wireless repeater mode)
- if, while in repeater mode, a wireless access point is not detected on the wireless interface, the network device changes to a wireless access point mode (e.g., to create a standalone wireless network)
- if the wired network connection is present (e.g., becomes connected at a later time), the device is placed in a routing mode, if the wired network connection is coupled to an untrusted network (as more fully described below)
- if the wired network connection is present, the device is placed in a bridging mode, if the wired network connection is coupled to a trusted network At block 305, the network device may load an operating configuration including one or more operating parameters. This operating configuration may be, for example, retrieved from a memory of the network communication device, or may be determined automatically by the network device (and, optionally, stored for later use). The network device may begin forwarding data according to its loaded configuration. At block 306, process 300 ends.

In conventional network devices, these devices either initialize themselves to their last saved mode, or do not forward data if no network connection is detected. Invoking a repeating mode in conventional wireless networking devices is a manual process. According to one aspect of the present invention, the device determines information relating to the network to which the device is coupled (or not coupled), and based on that information, determines its forwarding mode and operational settings.

If the device does not recognize a network to which the device is connected, the device may, according to one embodiment, seek to confirm with the user that a particular network setting should be used. This confirmation may be performed, for example, by intercepting a web access (e.g., an HTTP request) and by responding with a web page that requests information from the user regarding the configuration of the network device. The web page may include, for example, a control (e.g., a button) that indicates that the user accepts the configuration determined by the network device. Alternatively, the device may include a display (e.g., an LCD) that displays messages to the user. The network device may also include one or more buttons or switches that allow the user to select a particular configuration. Once the user selects a configuration, the network device may use operating parameters associated with the selected configuration.

In an alternative embodiment, the network device may identify more than one configuration that may be used with the identified network. In this case, the network device may automatically select the network used (e.g., according to a predetermined ranking of configurations) or may prompt the user (e.g., by any of the methods used above) to request that the user select a configuration that should be used. For instance, there may be a preferred ranking of configurations that may be used based on security level or other consideration, and the network device may automatically select the configuration based on the ranking.

The network device may also include an external physical switch that allows the user to change operating modes of the network device. For instance, the network device may include a switch that when pressed, selects a different operating mode of the network device. In another example, the mode used by the network device may be indicated to the user. This may be performed, for example, by indicating a configuration to a user in a screen of a display (e.g., an LCD display) associated with the network device, by lighting an indicator (e.g., an LED) associated with a particular configuration, or by any other indicating method.

According to another embodiment, the network device may store a number of preconfigured settings corresponding to a respective network. These preconfigured settings may be correlated with one or more attributes of the network. These settings may be stored as profiles in a database associated with the network device (e.g., in a nonvolatile memory of the network device).

The settings may be indexed, for example, by a parameter of the network (e.g., a parameter that is discovered or measured) that can be used to uniquely identify the network. For instance, an address (e.g., a MAC address) of a server (e.g., a DHCP server) that serves the address information to the network device may be used.

Determining Network Configuration

There are many ways that a network device may use to determine its configuration. One method by which a network device may determine what network to which it is connected is by examining, by the device, the information the device receives through one or more attached networks. One method by which a network device receives information from the network is through the Dynamic Host Configuration Protocol (or DHCP).

When a DHCP client (in this case, the network communication device) is first switched (e.g., powered) on, the client (network communication device) sends a broadcast packet on the attached network with a DHCP request message. This message is received by a DHCP server, which allocates an IP address to the client (network communication device), from one of the scopes (pools of addresses) the DHCP server has available.

As explained more fully in RFC 2131, Dynamic Host Configuration Protocol, DHCP has the ability to provide configuration parameters to Internet hosts. DHCP includes two components: a protocol for delivering host-specific configuration parameters from a DHCP server to a host, and a mechanism for allocating network addresses to hosts. DHCP is built on a client/server model, where designated DHCP server hosts allocate network addresses and deliver configuration parameters to dynamically configured hosts.

More specifically, the network device to be configured sends a DHCPDISCOVER broadcast message to locate a DHCP server. This DHCP server may be, for example, a function performed by a dedicated server, but is generally performed by a fileserver or other networking device (e.g., a network router) that performs other functions. A DHCP server offers configuration parameters (such as, for example, an IP address, a MAC address, a domain name, and a lease for the IP address) to the client in a DHCPOFFER unicast message addressed to the client.

A DHCP client may receive offers from multiple DHCP servers and can accept any one of the offers; however, the client usually accepts the first offer the client receives. Additionally, the offer from the DHCP server is not a guarantee that the IP address will be allocated to the client; but, the server usually reserves the address until the client has had a chance to formally request the address. The client returns a formal request for the offered IP address to the DHCP server in a DHCPREQUEST broadcast message. The DHCP server confirms that the IP address has been allocated to the client by returning a DHCPACK unicast message to the client.

Each DHCP scope is used for a different TCP/IP network segment. On networks with routers that support DHCP, extra information is added to the request by the router to indicate to the server which network the request came from. The DHCP server uses this information to pick an address from the correct scope. The server replies to the client, allocating it the TCP/IP address and settings required.

According to one embodiment of the present invention, the network device may use the well-known Media Access Control (MAC) address of the DHCP server as an indication as to what network the device is coupled. More specifically, it is realized that MAC addresses are in most instances, globally unique identifiers, used to uniquely identify hardware. This MAC address may be used as an index into a configuration of the network device based on that MAC address. However, it should be appreciated that the configuration of the network device may be determined by any other information, and the invention is not limited to only the DHCP server MAC address information.

For instance, a network device may automatically determine its operating mode based upon other attributes of the host LAN (e.g., wired vs. wireless, router MAC, router IP, DHCP server IP, DHCP server MAC, DNS server MAC, DNS server IP, device assigned IP address, device assigned IP subnet range, device assigned DNS suffix, SSID, encryption keys (WEP/WPA), operating frequency or channel, or other network information). Additionally, the network device may automatically load the proper settings for a given network. These settings may be stored in a memory associated with the network device.

Also, it should be appreciated that there may be more than one configuration associated with a network attribute such as a DHCP server MAC address or other network identifying information. In this case, there may be a more preferable configuration that is automatically selected by the network device as discussed above. Alternatively, the network device may prompt the user to select a configuration that should be used.

If the network to which the network device is connected is a totally unknown network, the network device may perform a process of determining the configuration for an unknown network, and may automatically determine an appropriate operating mode for this unknown network. Therefore, the device may optionally "learn" new networks by determining an operating configuration for the device and storing the learned configuration for later use.

Figure 1:
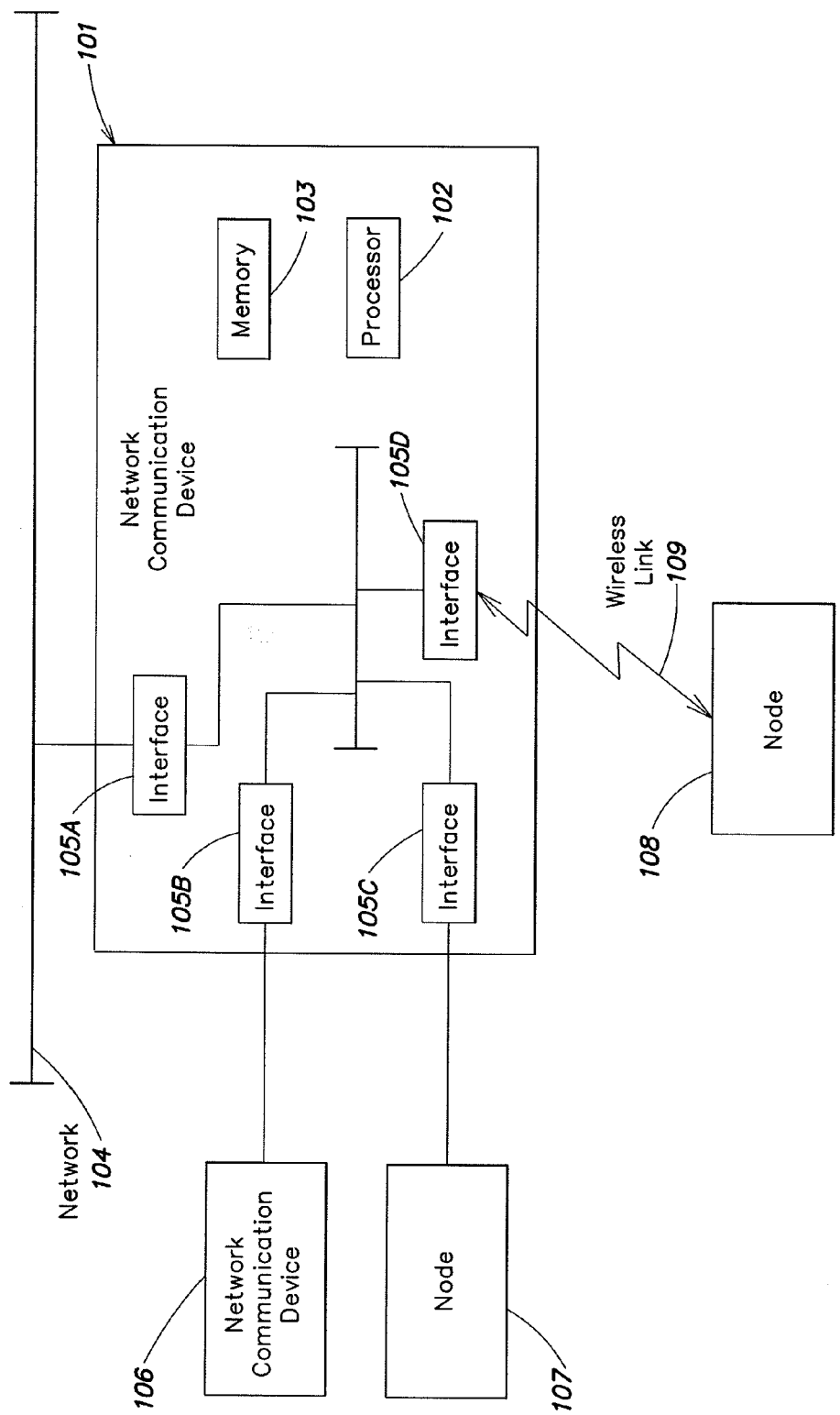
FIG. 1 shows a network communication device in which various aspects of the present invention may be implemented.

According to one embodiment, various aspects of the present invention may be implemented in a network communication device. For example, various aspects of the present invention may be implemented in the network communication device 101 as shown in FIG. 1. Network communication device 101 may include one or more interfaces 105A-105D (collectively, 105) that communicate with one or more networks, hosts (or nodes), or other network communication devices (e.g., routers, switches/bridges, etc.). For example, as shown in FIG. 1, network communication device 101 may be coupled to one or more nodes (e.g., nodes 107-108), one or more network communication devices (e.g., device 106), and/or one or more networks (e.g., network 104) via one or more network links (e.g., wireless link 109). The network communication device 101 is shown by way of example only, and the invention is not limited to the example shown. It should be appreciated that various aspects of the invention may be implemented in any type of network communication device having a different configuration, number of connections, or type of connections.

Also, although various aspects of the present invention are discussed in relation to a wireless networking device, it should be appreciated that various aspects of the present invention may be implemented with any type of network device having any type of network interface. For instance, an automatic mode selection feature may be implemented within a standard network communication device. Also, it should be appreciated that the network communication device may include any number of interfaces, interface types, support one or more protocols and may have any number of forwarding modes. Further, it is to be appreciated that the network communication device may implement any number of forwarding modes with different protocols, and the invention is not limited to implementing a single protocol.

Figure 2:
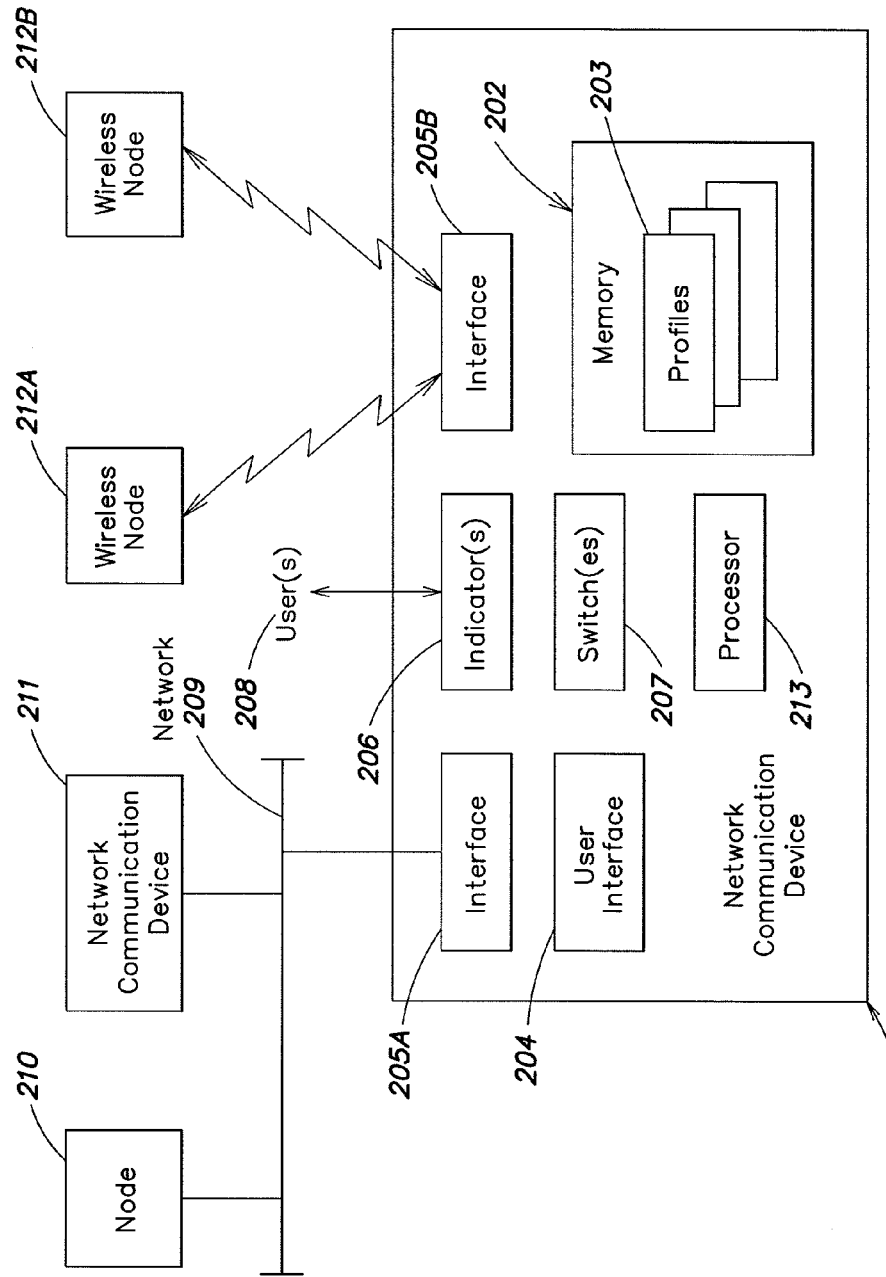
FIG. 2 shows a network communication device according to one embodiment of the present invention.

An example network communication device in which various aspects of the present invention may be implemented is shown with more particularity in FIG. 2. A network communication device 201 may be adapted to communicate information between one or more network devices such as, for example, one or more wireless nodes (e.g., nodes 212A-212B) coupled to device 201 through a wireless interface 205B. Wireless interface 205B may support one or more wireless networks, such as those using different channels or frequencies.

Device 201 may be capable of communicating information between networks such as wireless networks and one or more wired networks such as network 209. To this end, network communication device 201 may be coupled to one or more wired networks (e.g., network 209) through one or more interfaces (e.g., interface 205A). An attached network may be coupled to further nodes (e.g., node 210), network communication devices (e.g., device 211) or other networks.

An automatic mode selection feature according to one embodiment of the present invention may be implemented, for example, in firmware or software executed by a processor that controls whether the network device operates as a router, bridge/switch or repeater. More particularly, a network communication device 201 may include a processor 213 that is capable of executing a software program that determines whether device 201 operates as a router, a bridge/switch or a repeater. To this end, device 201 may include a memory 202 in which one or more profiles 203 may be stored that include operating parameters for device 201. Device 201 may include a user interface 204 which may include, for example, one or more programs, or services that may be executed by a client and/or device 201 to enable a user to configure device 201. Further, device 201 may include one or more indicators 206 that indicate to one or more users 208 the status and/or configuration of device 201. Device 201 may also include one or more switches 207 that may be used to configure device 201. In particular, a user may be permitted to select a particular forwarding mode used by device 201.

Although it is shown by way of example that features may be implemented in software, it should be appreciated that one or more of these features may be implemented in hardware, software, or combination thereof, and the invention is not limited to any particular implementation.

A device (e.g., device 201) implementing an automatic mode selection feature may provide a method for a user or administrator to easily create one or more profiles (e.g., profiles 203) associated with one or more networks. For example, the user or administrator may be permitted to add a currently connected network and its associated profile to a memory of the network device via, for example, a web browser user interface (UI), client software, a physical switch that stores the current network profile, file transfer protocol (e.g., FTP, TFTP) or physical media such as a USB key or other media type.

The device may store, for example, one or more identifiers associated with a network (e.g., a DHCP server MAC address) with a single network profile (e.g., a "trusted" or "untrusted" network profile). Alternatively, or in combination, the network device may store individual profiles associated with each network (e.g., profile for network A is the "home" profile, profile for network B is the "work" profile, etc.).

As mentioned above, a network may be indicated as "trusted" or not, and there may be a particular data forwarding mode that is associated with a trusted or non-trusted network (e.g., a routing mode for use on non-trusted networks and bridging mode for use on trusted networks). According to one embodiment, if the device is connected to a trusted wired network, the network automatically operates in bridging mode. When the device encounters a wired network not in the trusted group, the device automatically operates in the routing mode. As a further alternative, a repeater mode is automatically activated whenever the device is powered on without a link being present on a LAN port (e.g., a wired Ethernet port). Regardless of operational mode, whenever a recognized network is present, the appropriate settings profile become active.

As an alternative embodiment, when a network device attaches to an unrecognized wired network, the device operates as a router and intercepts outbound HTTP requests (e.g., from clients attached to the wireless network) as discussed above. The network device may receive each request and respond with a web page that prompts the user to select an operating mode. A user, through a user interface 204 downloaded from device 201 (e.g., an interface of a browser program), selects the operating mode, and the operating mode is used in the networking device. Optionally, the network device may generate a new profile to be used for this network, and if the network device is reset in the future (e.g., by a power cycle), the network device recognizes the network and loads the saved profile.

An alternative way to select the operating mode (and/or settings) of the network device may include the use of a mechanical switch that may be operated by the user. For example, the device may include a mechanical switch that allows a user to cycle through forwarding modes (repeater, bridge, router) used by the network device. Alternatively, the device may include different buttons that can be selected to change operating modes or used different profiles. As discussed above, the network device may include an interface that shows the current operating mode of the device. This interface may be, for example, an LCD or one or more LED indicators. For instance, the interface may include a tri-color LED that indicates whether the device is acting as a repeater, a bridge, or a router.

In another embodiment, when the device enters a repeating mode, the device is adapted to scan for wireless access points or wireless routers. If only one wireless access point or wireless router is found, then the network device begins repeating for the found device. In this manner, the conventional requirement for manually configuring a network device to enter the repeating mode is eliminated. If more than one wireless access point(s) and/or wireless router(s) are found, the network device may prompt the user (e.g., using the HTTP intercept method described above) to prompt the user to make a selection on which network to use. As an alternative, instead of prompting the user to choose the proper network to use, the device may determine whether one network was preferred over the other one(s), and the network having the higher preference could be used. This may be accomplished, for example, by storing, in a memory of the network device, an indication of preference for a particular network configuration (e.g., in a list of preferred networks) or by indicating a priority of each network with respect to other networks stored in memory of the network device.

In yet another embodiment, if no wireless networks are found, the network device may choose to enter a routing mode. The device then allows wireless clients to attach to the device through the wireless network, receive addresses (e.g., IP addresses) from the networking device and allows the clients to communicate among themselves. This is beneficial, as generally wireless clients need to be reconfigured to operate in an ad-hoc mode to communicate with each other when no wireless access point is present. Because the network device can reconfigure itself in a standalone mode and support client communication without manual changes either at the wireless access point or at the client, communication setup is made easier.

In another embodiment, there may be a case where a network to which the network device connects has an overlapping network range with that of another network defined on one of its ports. As an example, consider a wireless networking device that has a LAN port and a WAN port that has the same network defined on both ports. There may be a conflict such that when the network device is in router mode, the network device is unable to forward traffic between the LAN and WAN ports. This occurs frequently when a TCP/IP network address of 192.168.X.X is used in local networks, as is done generally behind network address translation (NAT) devices. In one example, a LAN port may have a network number of 192.168.1.0, and the WAN port may have the same network defined of 192.168.1.0 (with a subnet mask of 255.255.255.0). In this case, if a packet is received at either the LAN or WAN interfaces destined for a node in the 192.168.1.0 network, the packet will not be forwarded, as the network device believes that the packet is already on the destination network.

To alleviate this problem, the wireless network device when in routing mode may be adapted to determine that the same or overlapping (or other conflicting) settings are used on at least two of its ports. Upon determining that they are overlapping, the wireless networking device may automatically renumber its LAN TCP/IP address range (e.g., the wireless LAN) to another non-overlapping network number. For instance, in the example, above, the wireless network device may renumber its interface on the LAN network to be on the 192.168.2.0 network. In this manner, the network device may be able to automatically determine the conflict in this particular situation, and be able to forward packets received from and destined to wireless clients.

Although many of the examples discussed above relate to the TCP/IP protocol and its mechanisms, it should be appreciated that other protocols may be used such as Appletalk, IPX and other protocols. Also, non-routable protocols such as Netbeui may be supported by such a networking device. In such cases, the network device may automatically recognize that a particular protocol is in use, and configure its operating parameters to support it. For instance, if the network device detects the use of Netbeui on its wireless interface, the device may operate in a bridging mode so that the Netbeui data may be bridged between interfaces. If other routable protocols (e.g., IPX, Appletalk) are detected, the network device may configure itself in a routing mode and configure other settings (network numbers, encapsulation types, etc.) depending on what data is detected.

Various aspects of the present invention may be implemented in a wireless communication device as described with more particularity in U.S. application Ser. No. 10/649,031 filed Aug. 27, 2003 entitled "MOBILE WIRELESS ROUTER," incorporated herein by reference. Such a device may, for example, be powered by a power adapter that accepts a USB cable power source and adapts the source to power the wireless communication device. However, it should be appreciated that various aspects of the present invention may be implemented in other wireless communication devices, and the invention should not be limited to any particular device.

Also, various aspects of the present invention may be implemented by the commercially-available Wireless Mobile Router product available from the American Power Conversion Corporation, West Kingston, RI. However, it should be appreciated that various aspects of the present invention may be implemented in any type of router, and the invention is not limited for use with any specific router type.

It should be appreciated that the invention is not limited to each of embodiments listed above and described herein, but rather, various embodiments of the invention may be practiced alone or in combination with other embodiments.

Having thus described several aspects of at least one embodiment of this invention, it is to be appreciated that various alterations, modifications and improvements will readily occur to those skilled in the art. Such alterations, modifications, and improvements are intended to be part of this disclosure, and are intended to be within the spirit and scope of the invention. Accordingly, the foregoing description is by way of example only.

What is claimed is:

1. A method for determining configurations of a network device having a plurality of forwarding modes including a routing mode, a bridging mode and a repeating mode, the method comprising acts of:

determining a first indication of a first network to which the network device is coupled, the first indication being at least one of an address of a device coupled to the first network, at least a portion of a domain name assigned by an address server coupled to the first network, a security parameter associated with the first network and an identifier of the first network;

automatically selecting a first forwarding mode from the plurality of forwarding modes based at least in part on the first indication;

storing, within a plurality of profiles, an association between the first indication and the first forwarding mode, each profile of the plurality of profiles including at least one association between an indication of a network and a forwarding mode;

de-coupling the network device from the first network;

coupling the network device to a second network different from the first network;

determining a second indication of the second network to which the network device is coupled, the second indication being at least one of an address of a device coupled to the second network, at least a portion of a domain name assigned by an address server coupled to the second network, a security parameter associated with the second network and an identifier of the second network;

automatically selecting a second forwarding mode from the plurality of forwarding modes based at least in part on the second indication, the second forwarding mode being different from the first forwarding mode; and storing, within the plurality of profiles, an association between the second indication and the second forwarding mode.

2. The method according to claim 1, wherein determining the first indication includes determining at least one of:
   a router address;
   an address of the address server; and
   an address assigned by the address server.

3. The method according to claim 2, wherein determining the address of the address server includes determining an address of a Dynamic Host Configuration Protocol (DHCP) server.

4. The method according to claim 3, wherein determining the address of the DHCP server includes determining a Media Access Control (MAC) address of the DHCP server.

5. The method according to claim 3, wherein determining the address of the DHCP server includes determining a Transport Layer Protocol/Internet Protocol (TCP/IP) address of the DHCP server.

6. The method according to claim 1, wherein determining the first indication includes determining a domain name suffix.

7. The method according to claim 1, wherein determining the first indication includes determining a TCP/IP address.

8. The method according to claim 1, wherein the first network includes a wireless network and determining the identifier associated with the first network includes determining a service set identifier (SSID) of the wireless network.

9. The method according to claim 1, wherein determining the security parameter associated with the first network includes determining an encryption key.

10. The method according to claim 1, wherein determining the security parameter associated with the first network includes determining an encryption mode.

11. The method according to claim 1, further comprising:
    determining, based on the second indication, at least two forwarding modes of the plurality of forwarding modes;
    presenting, to a user, the at least two forwarding modes; and
    receiving, from the user, the second forwarding mode from a selection of one forwarding mode of the at least two forwarding modes.

12. The method according to claim 11, wherein receiving, from the user, the second forwarding mode includes receiving an indication that the user selected the second forwarding mode via an external physical switch.

13. The method according to claim 11, further comprising:
    intercepting, from a client coupled to the network device, a request; and
    responding to the request with an option to select the second forwarding mode from the at least two forwarding modes.

14. The method according to claim 1, wherein determining the first indication includes determining that the first network includes a wireless network and automatically selecting a first forwarding mode includes selecting a repeating mode to repeat signals for the wireless network.

15. The method according to claim 1, wherein determining the first indication includes determining that the first network is trusted and automatically selecting a first forwarding mode includes selecting a bridging mode.

16. The method according to claim 1, wherein determining the first indication includes determining that the first network is not trusted and automatically selecting a first forwarding mode includes selecting a routing mode.

17. The method according to claim 1, wherein determining the first indication includes determining that the first network uses a routable protocol and automatically selecting a first forwarding mode includes selecting a routing mode.

18. The method according to claim 1, wherein determining the first indication includes determining that the first network uses a non-routable protocol and automatically selecting a first forwarding mode includes selecting a bridging mode.

19. The method according to claim 1, wherein the network device includes a first network interface that couples the network device to the second network and a second network interface, the method further comprising:
    coupling the network device to a third network via the second network interface;
    determining a third indication of the third network to which the network device is coupled;
    automatically selecting a third forwarding mode from the plurality of forwarding modes based at least in part on the third indication;
    determining whether a first address assigned to the first network interface is in conflict with a second address assigned to the second network interface; and
    reassigning, responsive to determining that the first address is in conflict with the second address, a non-conflicting address to the second network interface.

20. A system for reconfiguring a network device having a plurality of forwarding modes including a routing mode, a bridging mode and a repeating mode, the system comprising:
    a memory;
    a network interface; and
    a processor coupled to the memory and the network interface and configured to:
        determine a first indication of a first network to which the network device is coupled via the network interface, the first indication being at least one of an address of a device coupled to the first network, at least a portion of a domain name assigned by an address server coupled to the first network, a security parameter associated with the first network and an identifier of the first network;

automatically select a first forwarding mode from the plurality of forwarding modes based at least in part on the first indication;

store, within a plurality of profiles located in the memory, an association between the first indication and the first forwarding mode, each profile of the plurality of profiles including at least one association between an indication of a network and a forwarding mode;

couple, responsive to determining that the network device is de-coupled from the first network, the network device to a second network different from the first network via the network interface;

determine a second indication of the second network to which the network device is coupled, the second indication being at least one of an address of a device coupled to the second network, at least a portion of a domain name assigned by an address server coupled to the second network, a security parameter associated with the second network and an identifier of the second network;

automatically select a second forwarding mode from the plurality of forwarding modes based at least in part on the second indication, the second forwarding mode being different from the first forwarding mode; and store, within the plurality of profiles, an association between the second indication and the second forwarding mode.

* * * * *